(12) United States Patent
Honeycutt

(10) Patent No.: US 7,464,804 B2
(45) Date of Patent: Dec. 16, 2008

(54) AUTOMATIC PALLET LOADER SYSTEM AND METHOD

(75) Inventor: Stanley Honeycutt, Spruce Pine, NC (US)

(73) Assignees: Baxter International Inc., Deerfield, IL (US); Baxter Healthcare S.A., Wallisellen, Zurich (CH)

( * ) Notice: Subject to any disclaimer, the term of this patent is extended or adjusted under 35 U.S.C. 154(b) by 231 days.

(21) Appl. No.: 11/458,850

(22) Filed: Jul. 20, 2006

(65) Prior Publication Data
US 2008/0017478 A1 Jan. 24, 2008

(51) Int. Cl.
*B65G 47/30* (2006.01)
(52) U.S. Cl. .................. 198/418.6; 198/431; 414/794.4
(58) Field of Classification Search .................. 198/600, 198/418.6, 461.3, 461.1, 461.2; 414/793.3, 414/794.4, 793.5, 793.4, 794.9
See application file for complete search history.

(56) References Cited

U.S. PATENT DOCUMENTS

| | | | | |
|---|---|---|---|---|
| 3,225,513 A | * | 12/1965 | Ehe | 198/431 |
| 5,427,226 A | * | 6/1995 | Ueda et al. | 198/418.6 |
| 5,951,238 A | | 9/1999 | Duecker | |
| 6,834,755 B2 | * | 12/2004 | Jay | 198/418.6 |
| 6,866,469 B2 | | 3/2005 | Harris et al. | |
| 2004/0069156 A1 | * | 4/2004 | Reed et al. | 198/418.6 |

* cited by examiner

*Primary Examiner*—James R Bidwell
(74) *Attorney, Agent, or Firm*—Jeffrey C. Nichols; Joseph P. Reagen; Bradford R. L. Price

(57) ABSTRACT

A loading system is provided which has a first conveyor for transporting a support structure and a second conveyor for transporting an article. The second conveyor includes a substantially stationary inclined transfer member that directs the article to a loading zone of the first conveyor. The article is received in the loading zone by a support structure being moved through the loading zone by the first conveyor. The article may be moving at substantially the same speed and in substantially the same direction as the support structure when it is received by the same. Loading systems according to the present invention may be used in a method wherein a moving article is received on a moving support structure.

18 Claims, 4 Drawing Sheets

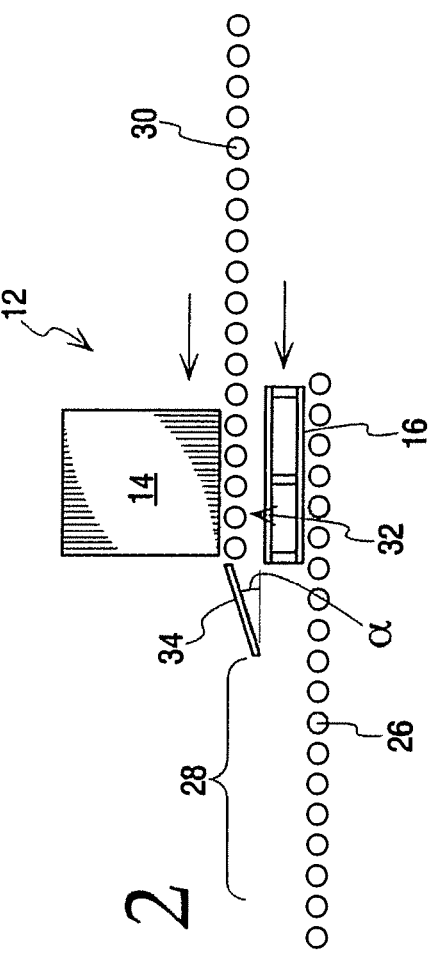
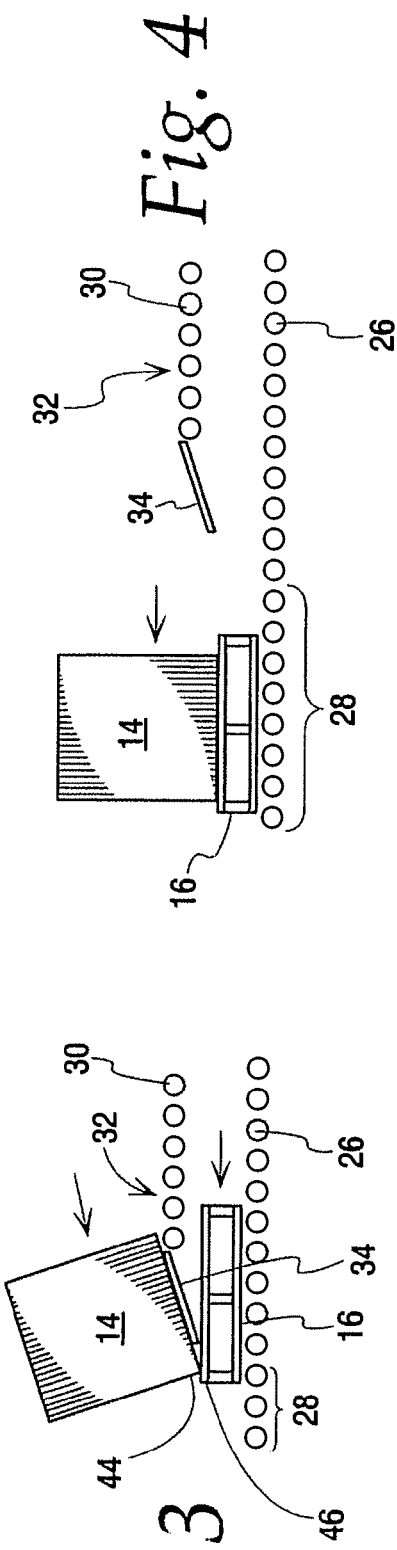

US 7,464,804 B2

AUTOMATIC PALLET LOADER SYSTEM AND METHOD

BACKGROUND OF THE INVENTION

1. Field of the Invention

This invention generally relates to systems and methods for automatically loading an article onto a support structure, typically a pallet. More particularly, the invention relates to a system for loading a moving article onto a moving pallet.

2. Description of Related Art

The use of wooden pallets for loading and transporting articles is well known. At smaller plants or for smaller shipping volumes, it is common to manually load a bare pallet with articles, typically relatively small boxed articles that can be lifted by hand, one at a time until a desired number of articles has been placed on the pallet. A slipsheet may be placed onto the pallet before loading the articles in order to protect the lowermost articles. When the pallet has been fully loaded, the loose articles may be wrapped with a flexible, clear plastic material in order to prevent them from falling off of the pallet during transport. The pallet and wrapped articles are then moved into storage or onto a transport vehicle with a forklift, pallet jack, or the like.

At more sophisticated or larger plants, it is common to automate the pallet loading process, especially for larger volume shipments. According to one method, an integrated or pre-wrapped collection of articles is vertically lifted a sufficient distance, such as by a forklift, to allow a bare pallet to be placed beneath the articles, and then the articles are lowered onto the stationary pallet. An example of such a system and method is described in U.S. Pat. No. 5,951,238 to Duecker, which is hereby incorporated herein by reference. Such systems, while more efficient than manual pallet loading, are still relatively inefficient because they require the downstream advancement of the load to come to a complete stop while it is lifted, a pallet is placed, the load is lowered onto the pallet, and the lifting mechanism is withdrawn. Furthermore, such systems also require lifting mechanisms for lifting and lowering the load.

According to another known method, instead of vertically lifting the load, the load is horizontally pushed onto a stationary pallet. In such systems, a full load is typically moved along a first conveyor arranged transversely with respect to a second conveyor. A bare pallet is moved into position by the second conveyor, and then positioned at the exit of the first conveyor, with the top surface of the pallet some distance below the level of the first conveyor. The pallet is held in place or the second conveyor is deactivated and the load is advanced along the first conveyor to drop onto the pallet. Thereafter, the loaded pallet is advanced along the second conveyor for removal from the loading system. One example of a system according to the foregoing description is described in U.S. Pat. No. 6,866,469 to Harris et al., which is hereby incorporated herein by reference. Such horizontal displacement systems may be considered an improvement over vertical displacement systems, in terms of efficiency and cost, but it will be appreciated by those of ordinary skill in the art that advances in efficiency are still needed.

As set forth in more detail below, the present invention provides a loading system and method with increased efficiency and other benefits as compared to known systems and methods.

SUMMARY OF THE INVENTION

The present invention, in one aspect, provides a loading system for loading an article onto a support structure. The loading system includes a first transport conveyor for carrying a support structure and a second transport conveyor for transporting an article. The first transport conveyor has a loading zone and the second transport conveyor has a discharge end in proximity to and above the loading zone. A substantially stationary inclined transfer member is located at the discharge end of the second transport conveyor in a supplying relationship with respect to the loading zone. In use, the article moves from the discharge end of the second conveyor and along the inclined transfer member for receipt on a support structure in the loading zone of the first transport conveyor.

In accordance with another aspect of the present invention, a loading system comprises a first transport conveyor having a loading zone and a second transport conveyor having a discharge end above and in a supplying relationship with respect to the loading zone. The first transport conveyor is adapted to move a support structure into the loading zone, while the discharge end of the second transport conveyor is adapted to move an article into the loading zone. In use, the support structure and the article are moved into the loading zone at generally the same time.

In accordance with yet another aspect of the present invention, a method for loading an article onto a support structure includes transporting a support structure to a loading zone of a first transport conveyor. An article is transported to a discharge end of a second transport conveyor, the discharge end being above and in a supplying relationship with respect to the loading zone. The support structure is moved into the loading zone and the article is moved from the discharge end of the second transport conveyor and onto the moving support structure at the loading zone.

BRIEF DESCRIPTION OF THE DRAWINGS

FIGS. 2-4 illustrate a method of loading an article onto a support structure using the loading system of FIG. 1;

DESCRIPTION OF THE PREFERRED EMBODIMENT

Although the present invention is described as illustrated in the attached drawings of the preferred embodiment, it is to be understood that the disclosed embodiments are merely exemplary of the invention, which may be embodied in various forms. Therefore, specific details disclosed herein are not to be interpreted as limiting, but as a representative basis for teaching one skilled in the art to variously employ the present invention in any appropriate manner.

Figure 1:
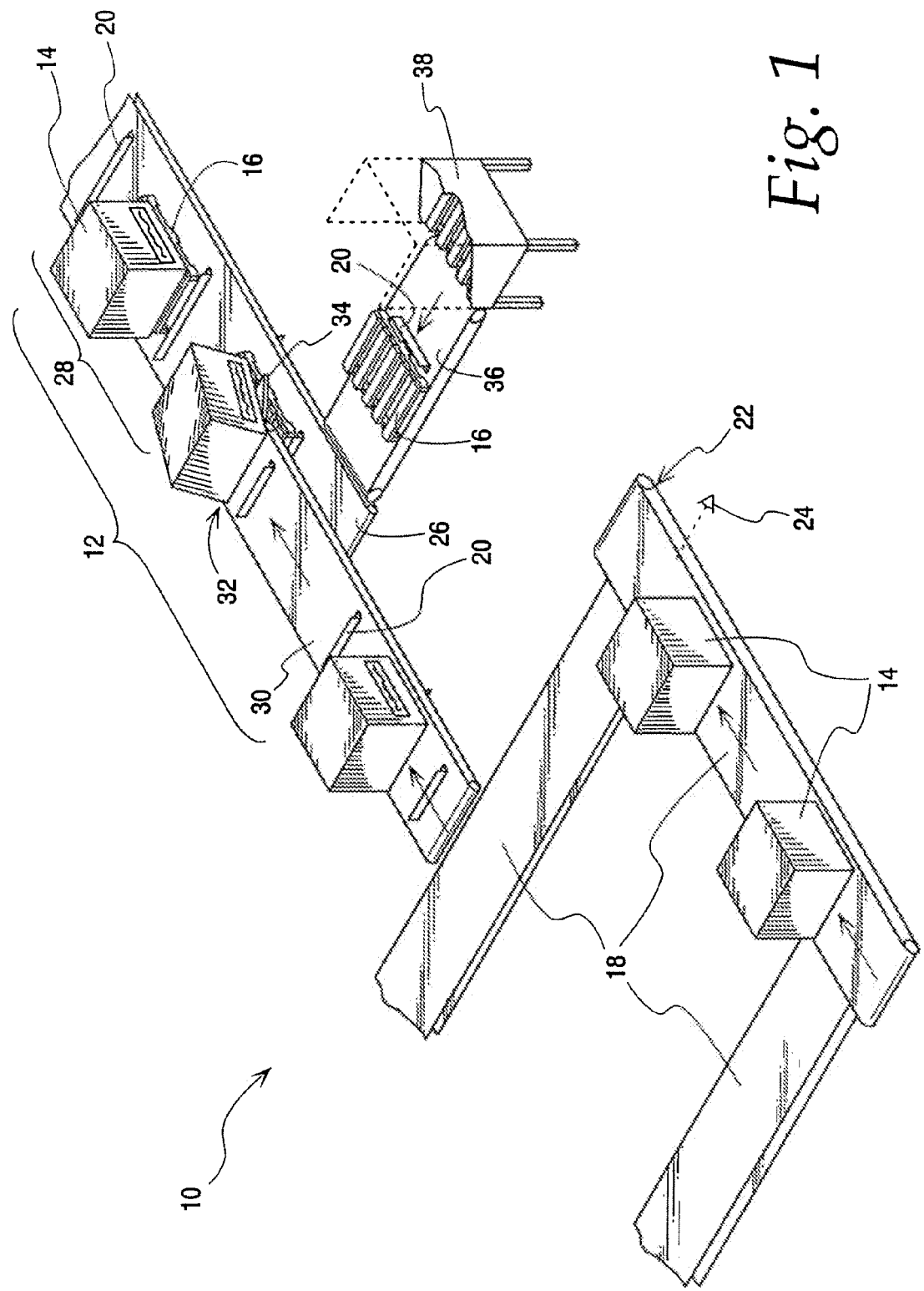
FIG. 1 is a perspective view of a palletization system incorporating a loading system according to an aspect of the present invention.

FIG. 1 shows a palletization system 10 with a loading system 12 according to the present invention. The unlabeled arrows in the various figures represent the transport direction of articles 14 and pallets or support structures 16 through the palletization system 10 and/or the loading system 12. The palletization system 10 may include a plurality of conveyors 18 arranged to transport an article 14 to the loading system 12. Any of the conveyors of the palletization system 10 and/or the loading system 12 may be provided with pusher members 20 to assist in moving the articles 14 along the conveyor. The article 14 may comprise a plurality of stacked and wrapped sub-articles, such as a wrapped collection of boxes of medical solutions or any other product transportable in a box, arranged to constitute a complete load for a support structure 16. The article 14 may also be transported upon a slipsheet of heavy duty paper or film (not illustrated) to separate the article 14 from the conveyor or a support structure 16 onto which the article 14 is ultimately loaded.

According to known design, the palletization system 10 may be provided with a plurality of output zones, illustrated generally in FIG. 1 as a "conforming" output zone corresponding to the loading system 12 and a separate "non-conforming" output zone 22. Preferably, the palletization system 10 includes one or more photo-eyes or other monitoring means 24 to regulate operation of the conveyors 18 and direct selected articles to the loading system 12 and other selected articles, typically defective articles or those not adapted to be processed by the loading system 12, to the "non-conforming" output zone 22. While an exemplary palletization system 10 is illustrated in FIG. 1, it will be appreciated from the following description that loading systems and methods according to the present invention may be incorporated into virtually any article-conveying system.

The loading system 12, more particularly illustrated in FIGS. 2-6, includes a first or lower transport conveyor 26 having a loading zone, generally designated at 28, and a second or upper transport conveyor 30. Both conveyors 26 and 30 may optionally be provided as chain conveyors. The upper conveyor 30 includes a discharge end, generally designated at 32, in proximity to and above the loading zone 28 and in a supplying relationship with respect to the loading zone 28. The upper conveyor 30 may also include a substantially stationary inclined transfer member or transition plate 34 associated with the discharge end 32 and in a supplying relationship with respect to the loading zone 28. As used herein, the term "supplying relationship" refers to the arrangement of the upper and lower conveyors 26 and 30 of the loading system 12 which causes the movement of an article 14 from the discharge end 32 and/or the inclined transfer member 34 into the loading zone 28 of the lower transport conveyor 26.

The substantially stationary inclined transfer member 34 may comprise a rigid plate angled downwardly from the discharge end 32 of the upper conveyor 30, as illustrated in FIGS. 1-4. When used herein, the term "substantially stationary" is used in contrast to a driven or movable surface, such as that of a chain conveyor or roller conveyor. However, the inclined transfer member 34 may be moved and adjusted with respect to the discharge end 32 of the upper conveyor 30 when the inclined transfer member 34 is not being used to load an article 14. For example, the inclined transfer member 34 may be translated vertically or laterally or the inclination angle α (FIG. 2) may be adjusted without departing from the scope of the present invention. Such translation and/or angular adjustment may be performed to allow the loading system 12 to accommodate a variety of different articles and/or support structures without requiring a second loading system. It is even contemplated that adjustments to the position and/or angle of the inclined transfer member 34 may be computerized, with sensing means and a programmable logic controller (not illustrated) being provided to customize the loading system 12 on the fly for each article-support structure pair. Thus, it may be preferred to provide the discharge end 32 of the upper conveyor 30 with an inclined transfer member 34 for enhanced adjustability. If the inclined transfer member 34 is adjustable, the separation distance between the bottom of the inclined transfer member 34 and the top of the loading zone 28 is preferably greater than the height of a support structure 16 to be introduced to the loading system 12. If the separation distance between the inclined transfer member 34 and the loading zone 28 is not greater than the height of the support structure 16, then the support structure 16 may become lodged beneath the inclined transfer member 34 and disrupt the proper operation of the loading system 12.

Figure 5:
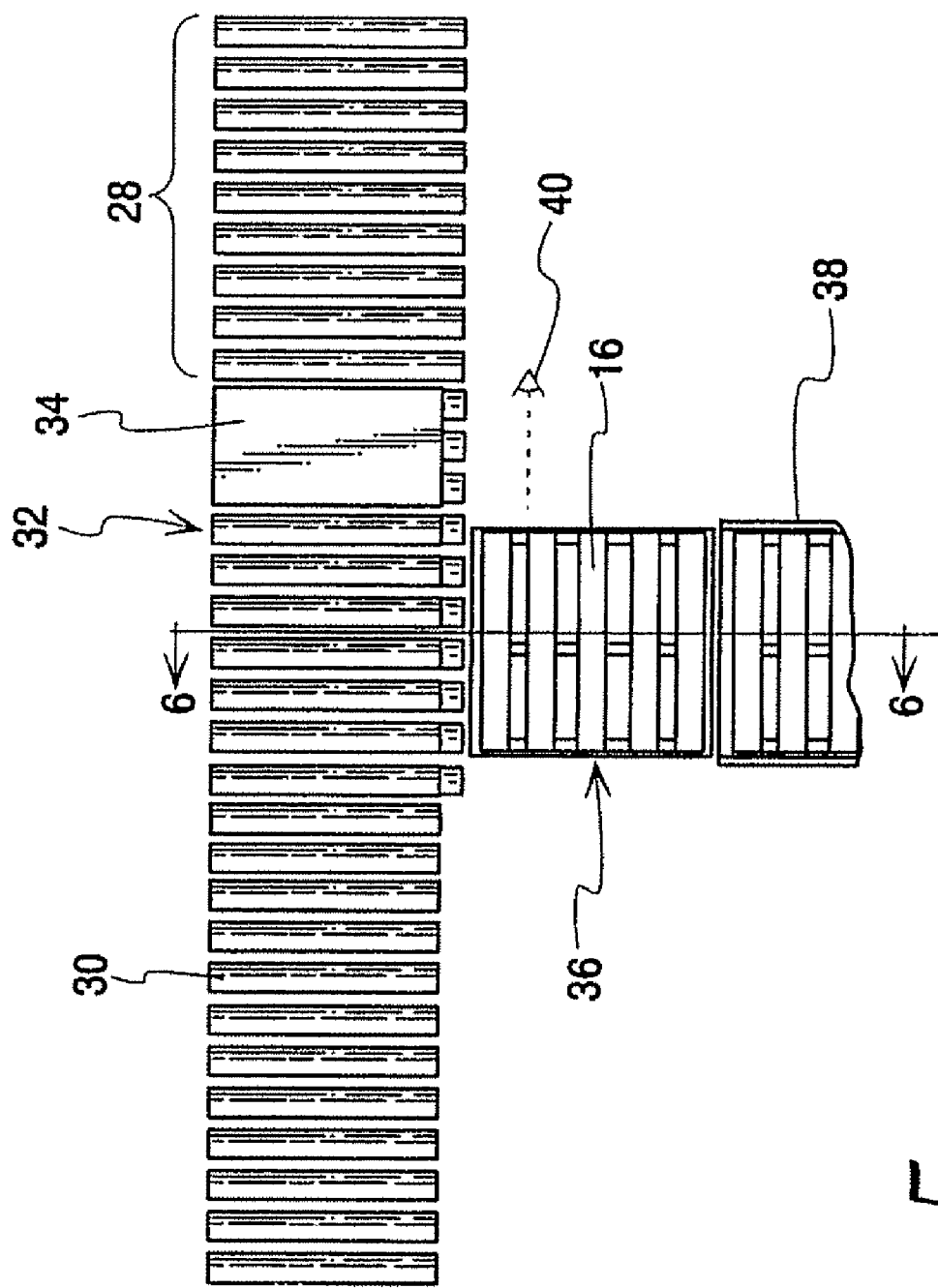
FIG. 5 is a top plan view of the loading system of FIG. 1.
Figure 6:
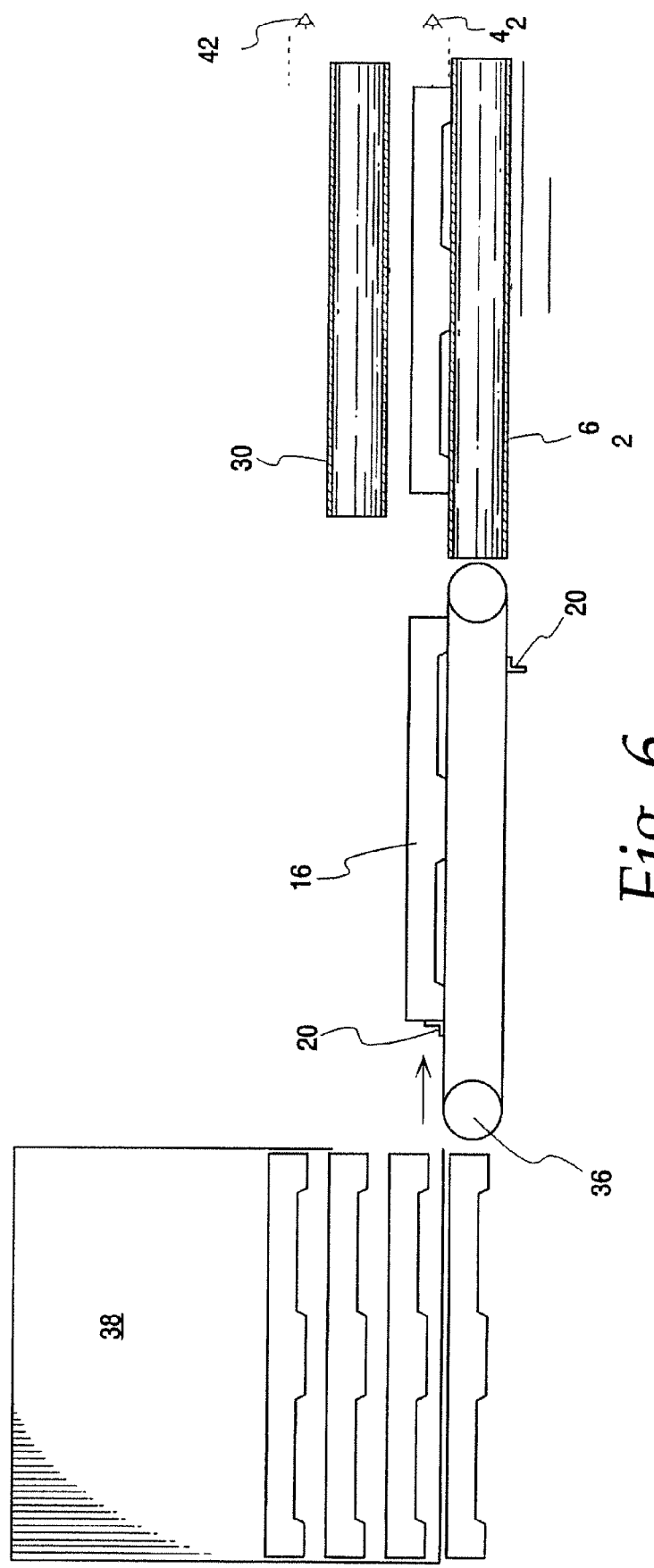
FIG. 6 is a cross-sectional view of the loading system of FIG. 1, taken through the line 6-6 of FIG. 5.

A pallet or support structure is typically larger than the article which it supports, so the lower conveyor 26 may be wider than the upper conveyor 30 in order to accommodate a larger support structure 16. Support structures 16 are preferably provided to the lower conveyor 26 by a third transport conveyor 36, as shown in FIGS. 1, 5, and 6. To automate the support structure supply process, the support structures 16 may be supplied by the third conveyor 36 from a pallet dispenser or other support structure dispensing means 38. Pallet dispensers are well-known to those of ordinary skill in the art and provide an intermittent stream of bare pallets to be loaded. Suitable pallet dispensers for use with loading systems according to the present invention include those from U.S. Web Converting Machinery Corp. of Bloomsburg, Pa. As illustrated in FIGS. 1, 5, and 6, the third conveyor 36 may be relatively short and oriented transversely with respect to the lower conveyor 26. This may be preferred to reduce the overall length of conveyors used and to reduce the footprint of the palletization system 10 and the loading system 12. Alternatively, instead of using a third conveyor 36 and a support structure dispensing means 38 to supply the lower conveyor 26 with support structures 16, the support structures 16 may be directly loaded onto the lower conveyor 26 by hand or any other means.

In order to ensure that the loading zone 12 is not supplied with a support member 16 that is outside a range of suitable heights, the loading system 12 may include a photo eye or sensing member 40. The sensing member 40 may be oriented to analyze a support structure 16 on the third conveyor 36, if provided, or on the lower conveyor 26 at a location prior to the support structure 16 entering the loading zone 28 or passing beneath the inclined transfer member 34, if provided. If the supplied support structure 16 has an improper height (for example, too high to fit in the space between the conveyors 26 and 30), then the sensing member 40 may trigger an alarm signal, or halt the associated conveyor, or cause the associated conveyor to discharge the support structure 16 from the loading system 12.

Loading systems according to the present invention operate as generally illustrated in FIGS. 2-4. An article 14 is delivered to the discharge end 32 of the upper conveyor 30 or an area preceding the discharge end 32. The upper conveyor 30 may receive an article 14 from the conveyor set of the palletization system 10 or it may instead extend into and define a portion of the conveyor set of the palletization system 10. A support structure 16 is delivered to an area of the lower conveyor 26 preceding the loading zone 28. If the support structure 16 is provided to the lower conveyor 26 by a third conveyor 36, then the next support structure may be moved onto the third conveyor 36 when the previous support structure has been moved onto the lower conveyor 26. The article 14 and support structure 16 may be delivered to the positions of FIG. 2 at the same general time or at different times. If the pieces arrive at different times, then the conveyor associated with the piece arriving first may be temporarily halted to prevent premature entry of the piece into the loading zone 28. Alternatively, both conveyors 26 and 30 may be temporarily halted with the article 14 and the support structure 16 in the position of FIG. 2, which may be preferred for better controlling the entry of the article 14 and the support structure 16 into the loading zone 28. One or more photo eyes or other sensing members 42 may be provided to determine the speed and/or location of the article 14 and/or the support structure 16, which may further improve operation of the loading system 12.

When the article 14 and the support structure 16 have reached the general position of FIG. 2, whether moving or temporarily stationary, both may be advanced into the loading zone 28. In a preferred embodiment, the conveyors 26 and 30 are adapted to move the support structure 16 and the article 14 into the loading zone 28 in substantially the same horizontal direction, illustrated in FIG. 3 as right to left. The conveyors 26 and 30 may also be adapted to be driven at substantially the same speed, in which case they will move the support structure 16 and the article 14 into the loading zone 28 at substantially the same horizontal speed.

Regardless of whether the support structure 16 and the article 14 move into the loading zone 28 in substantially the same horizontal direction and/or at substantially the same horizontal speed, they are preferably moved into the loading zone 28 at generally the same time. The discharge end 32 and/or inclined transfer member 34 of the upper conveyor 30 may be adapted to load a moving article 14 onto a moving support structure 16, in which case the article 14 and support structure 16 should enter the loading zone 28 at generally the same time so that the article 14 will land securely on the support structure 16. For example, in the embodiment illustrated in FIGS. 2-4, the conveyors 26 and 30 are driven at substantially the same speed, which advances the support structure 16 toward the loading zone 28 and advances the article 14 onto the inclined transfer member 34, if provided. The support structure 16 continues advancing toward the loading zone 28, while the article 14 moves (e.g., slides) along the inclined transfer member 34 by gravity.

The support structure 16 enters the loading zone 28 at generally the same time as the article 14, and the article 14 first touches down on the moving support structure 16, as shown in FIG. 3. The path of the article 14 into the loading zone 28 involves a horizontal component and a vertical component, in contrast to the preferably purely horizontal movement of the support structure 16, and such a longer path may cause a front corner 44 of the article 14 to contact the support structure 16 some small distance behind a front corner 46 of the support structure 16, as shown in FIG. 3. This phenomenon can be avoided by starting the conveyors 26 and 30 at different times or by driving them at different speeds, but such placement of the article 14 may be preferred in order to center the article 14 on the support structure 16, as shown in FIG. 4.

When the article 14 has first contacted the support structure 16, the lower conveyor 26 continues moving the support structure 16 through the loading zone 28. The article 14 is moved further into the loading zone 28 by the combined action of the support structure 16 (through action of the lower conveyor 26) and the inclined transfer member 34 and/or the discharge end 32 of the upper conveyor 30 until it moves off of the inclined transfer member 34 or discharge end 32 and comes to rest fully on the moving support structure 16, as shown in FIG. 4. The combined support structure 16 and article 14 may then exit the loading zone 28 to be removed from the loading system 12 by a forklift or other means.

According to one preferred embodiment of the above system, which has been found suitable for loading boxed medical solutions onto 40"×48" wooden pallets, the conveyors 26 and 30 are vertically separated by approximately 6 inches, with an inclined transfer member 34 approximately 10 inches long and oriented at an approximately 9° inclination angle α. The lower conveyor 26 is driven to provide pallets 16 to the loading zone 28 at a horizontal speed of approximately 36 ft/min, while the upper conveyor 30 is driven to provide articles 14 to the loading zone 28 at a horizontal speed of approximately 36 ft/min. The timing of the various conveyors is preferably controlled by a plurality of photo eyes associated with a programmable logic controller to optimally coordinate the loading process with respect to the position and speed of the articles and pallets. By such an arrangement, the articles 14 are loaded onto moving pallets 16, which represents an increase in efficiency compared to known automated loading systems.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein. For these reasons, the scope of the invention is not limited to the above description but is as set forth in the following claims.

The invention claimed is:

1. A loading system for loading an article onto a support structure, comprising: a first transport conveyor for carrying a support structure, the first transport conveyor having a loading zone;
   a sensing member for determining the height of the support structure;
   a second transport conveyor for transporting an article to a discharge end of the second transport conveyor in proximity to and above the loading zone; and
   a substantially stationary inclined transfer member located at the discharge end of the second transport conveyor in a supplying relationship with respect to the loading zone, wherein the article moves from the discharge end of the second conveyor and along the inclined transfer member for receipt on a support structure in the loading zone of the first transport conveyor.

2. The loading system of claim 1, wherein the inclined transfer member allows the article to move along at least a portion thereof by gravity.

3. The loading system of claim 1, wherein the inclined transfer member has an adjustable inclination angle.

4. The loading system of claim 1, wherein the first transport conveyor is adapted to move the support structure into the loading zone and the second transport conveyor and the inclined transfer member are adapted to move the article into the loading zone at generally the same time.

5. The loading system of claim 4, wherein the first transport conveyor is adapted to move the support structure into the loading zone in a horizontal direction and the second transport conveyor and the inclined transfer member are adapted to move the article into the loading zone in substantially the same horizontal direction.

6. The loading system of claim 4, wherein the first transport conveyor is adapted to move the support structure into the loading zone at a horizontal speed and the second transport conveyor and the inclined transfer member are adapted to move the article into the loading zone at substantially the same horizontal speed.

7. The loading system of claim 1, further comprising a sensing member for sensing one or both of the location and speed of one of the article and the support structure.

8. A loading system for loading an article onto a support structure, comprising:

a first transport conveyor having a loading zone and adapted to move a support structure into the loading zone;

a sensing member for determining the height of the support structure; and a second transport conveyor having a discharge end above and in a supplying relationship with respect to the loading zone, wherein the discharge end of the second transport conveyor is adapted to move an article into the loading zone and the first transport conveyor is adapted to move the support structure into the loading zone at generally the same time.

9. The loading system of claim 8, wherein the first transport conveyor is adapted to move the support structure into the loading zone in a horizontal direction and the discharge end of the second transport conveyor is adapted to move the article into the loading zone in substantially the same horizontal direction.

10. The loading system of claim 8, wherein the lower transport member is adapted to move the support structure into the loading zone at a horizontal speed and the discharge end is adapted to move the article into the loading zone at substantially the same horizontal speed.

11. The loading system of claim 8, further comprising a sensing member for sensing one or both of the location and speed of one of the article and the support structure.

12. The loading system of claim 8, wherein the discharge end of the second transport conveyor includes a substantially stationary inclined transfer member above and in a supplying relationship with respect to the loading zone.

13. A method of loading an article onto a support structure, the method comprising:

sensing the height of a support structure;

transporting the support structure to a loading zone of a first transport conveyor;

transporting an article to a discharge end of a second transport conveyor, the discharge end being above and in a supplying relationship with respect to the loading zone;

moving the support structure into the loading zone; and moving the article from the discharge end of the second transport conveyor and onto the moving support structure at the loading zone of the first transport conveyor.

14. The method of claim 13, wherein said moving the article further includes moving the article along a substantially stationary inclined transfer member of the discharge end of the second transport conveyor and onto the moving support structure.

15. The method of claim 13, wherein said moving the support structure further includes sensing one or both of the location and speed of the article.

16. The method of claim 13, wherein said moving the article further includes sensing one or both of the location and speed of the support structure.

17. The method of claim 13, wherein said moving the article further includes moving the article in substantially the same horizontal direction as the moving support structure.

18. The method of claim 13, wherein said moving the article further includes moving the article at substantially the same horizontal speed as the moving support structure.

* * * * *